Nov. 5, 1940. C. C. MOORE, JR., ET AL 2,220,345

DIESEL ENGINE FUEL

Filed Sept. 3, 1935

INVENTORS
C. C. Moore Jr. &
G. C. Shepherd Jr.
BY Philip Subkow
ATTORNEY.

Patented Nov. 5, 1940

2,220,345

UNITED STATES PATENT OFFICE 2,220,345

DIESEL ENGINE FUEL

Charles Chilton Moore, Jr., Palos Verdes Estates, and George Chapelton Shepherd, Jr., Long Beach, Calif., assignors to Union Oil Company of California, Los Angeles, Calif., a corporation of California Application September 3, 1935, Serial No. 38,984

12 Claims. (Cl. 44—9)

This invention relates to compression ignition internal combustion engine fuels such as Diesel engine fuels. The ignition of fuel in a compression ignition engine never occurs simultaneously with the first appearance of the injected fuel in the combustion chamber, but at some time interval thereafter. This time interval between the initial appearance of the injected fuel in the combustion chamber and its initial spontaneous ignition is termed the "ignition delay" or "ignition lag," and the duration of this lag is a measure of the ignition qualities of the fuel oil. Different fuels manifest different qualities in this respect.

When the rotational speeds of compression ignition engines were relatively low as compared with the actual ignition delay of the injected fuels, the ignition lag did not materially affect engine performance even with fuels of poor ignition characteristics. However, in the high speed Diesel engines now in process of development, the actual ignition lag time interval has become an item of major importance. Since the actual ignition lag time interval remains substantially constant on any given fuel for all engine speeds, the same ignition lag time interval in a high speed compression engine occupies a greater interval of time relative to the engine cycle and hence the delay becomes here proportionately larger.

The number of degrees that the crank-shaft rotates during the ignition lag, which is the interval between the fuel injection and the instant of fuel ignition, has been conveniently expressed by the term "delay number." Ignition delay or ignition lag, particularly in a high speed compression ignition engine, results in the accumulation of unburned fuel in the combustion chamber during the early portion of each injection cycle until spontaneous ignition finally occurs. Ignition delays which are long relative to the rotational displacement of the crank shaft, or in other words, combined fuel ignition characteristics, and relative engine speeds resulting in a high ignition delay number, will allow an excessive amount of unburned fuel to accumulate during injection so that when ignition finally occurs, the pressure rise in the combustion chamber due to the sudden combustion of the accumulated fuel will reach undesirable or even unsafe limits and, moreover, the pressure rise will be in many cases of such suddenness as to produce what is known as Diesel knock. This Diesel knock may be as detrimental to good operation in a Diesel engine as is detonation in a gasoline engine. Fuels which have poor ignition qualities are, therefore, a most common cause of knocking or rough running in high speed compression ignition engines. It may be said that in general nearly all difficulties such as knock, rough running, loss of power, smoky exhaust, and difficulty in cold starting, are primarily caused by poor ignition resulting from fuel having poor ignition qualities or high delay numbers.

Objects of this invention are, therefore, to present a fuel suitable for compression ignition engines and having improved ignition characteristics. It is another object of this invention to present a compression ignition engine fuel of desirable ignition characteristics and a low pour point. It is a further object of this invention to produce a fuel having a low ignition delay number, a low pour point and proper viscosity-gravity characteristics.

The objects of this invention are attained, in general, by employing a mixture of a highly paraffinic oil and a pour point depressant, and/or a normal or residual blending agent.

It is desirable that the ignition quality of compression ignition internal combustion engine fuels be expressed in terms of standard reference fuels instead of in terms of delay numbers, much in the same manner as the detonating quality of gasoline is expressed in terms of the proportions of blends of iso-octane and normal heptane which produce the same amount of detonation as the rated gasolines.

Two materials which have been similarly employed as reference fuels for rating the ignition qualities of Diesel engine fuel are cetene, a sixteen carbon atom straight chain compound having one unsaturated bond, and alpha methyl naphthalene. Cetene has an extremely low ignition lag while the alpha methyl naphthalene will not ordinarily ignite in a compression ignition engine. Varying mixed proportions of cetene and alpha methyl naphthalene result in blends which manifest varying delay numbers as shown in Fig. 3. From this correlation it is possible to rate a fuel of known delay number as determined by standard test conditions, directly in terms of the proportions of these standard fuels which produce the same delay number. This rating is known as the cetene number of the fuel.

This invention resides broadly in a compression ignition internal combustion engine fuel having a low pour point, a high cetene number and a low delay number comprising a blend of waxy distillate of relatively high cetene number, due to its paraffinicity, and a pour point repressant. This invention resides more specifically in a high cetene number Diesel fuel comprising a blend of a waxy distillate and pour point depressants, having sufficient viscosity at normal temperatures to provide adequate lubrication for the injection pumps and at the same time possess a low enough pour point for operation under reasonably low temperature conditions.

The invention also resides in a compression ignition internal combustion engine fuel having a low pour point, a high cetene number or a low viscosity-gravity constant, and a low delay number comprising a blend of paraffinic oils, non-paraffinic oils and suitable pour point depressants. The invention further includes the said blended fuel containing added residual hydrocarbons in proportion insufficient to materially degenerate the ignition characteristics of the blend but in quantity to materially lower the pour point thereof.

The invention comprises specifically a high cetene number compression ignition internal combustion engine fuel containing a blend of a paraffinic hydrocarbon fraction, a non-paraffinic hydrocarbon fraction diluent and a residual hydrocarbon fraction pour point depressant.

Figure 1:
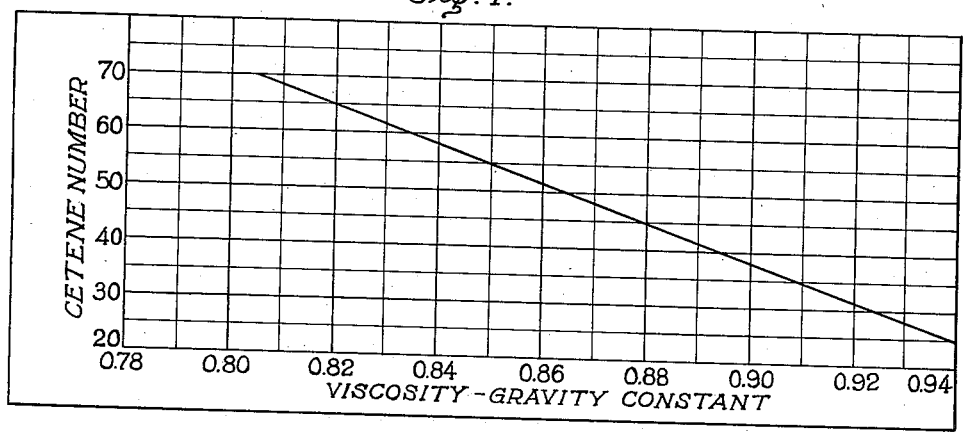
Fig. 1 is a curve showing the relationships between cetene number and viscosity-gravity constant of Diesel fuel oils.

Paraffinic oils are those which exhibit low temperature-viscosity susceptibilities such as those oils derived from Eastern crude oils and these oils are comprised largely of paraffinic or saturated hydrocarbon compounds.

Non-paraffinic oils are those which exhibit high temperature-viscosity susceptibility such as those derived from Western crude oils, and these oils are composed largely of asphaltic, naphthenic or aromatic hydrocarbon compounds.

It is generally recognized that the ignition quality of a compression ignition engine fuel is largely a function of its paraffinicity and that, therefore, the highly paraffinic type of oil is preferable over the aromatic type of oil for use as fuel in high speed compression ignition or Diesel engines. Such highly paraffinic oil having a viscosity suitable for proper lubrication of the injection pumps and having efficient injection characteristics has, however, a high pour point such that it is not alone suitable for commercial use as a Diesel engine fuel where low temperatures are likely to be encountered. Thus, a heavy gas oil cut from a paraffinic or a mixed paraffinic and asphaltic crude oil is of a highly paraffinic waxy nature and has the low ignition lag characteristics which are desirable. This heavy gas oil has, however, as mentioned above, a higher pour point than is desirable in a commercial Diesel engine fuel which must be used under extreme variations in temperature conditions.

For example, a heavy gas oil formed by the distillation of a Los Angeles Basin petroleum residuum having a gravity of 27° A. P. I. at 60° F., and approximately 70 seconds viscosity (Saybolt Universal) at 100° F., meets the requirements of a wholly satisfactory compression ignition engine fuel insofar as ignition characteristics alone are concerned. This gas oil has a pour point of 75° F. which unfits it for use even at ordinary temperatures.

However, such a high pour point gas oil may be rendered suitable for general use by blending into it suitable pour point depressants without sacrificing its inherent desirable ignition characteristics. There are a large number of such pour point depressants subsequently enumerated which may be employed.

It has been found that certain high molecular weight bodies from petroleum are effective in depressing the pour point of oils. These high molecular weight bodies are found associated with residual oil and especially with residual oil resulting from conversion processes and commonly known as "cracked" residuum. For example, the residuum obtained from the bottom of the evaporator in a Cross cracking plant is found to contain effective pour point depressants.

Four volumes of the above heavy paraffinic gas oil having a pour point of 75° F. was added to one volume of 18.5° A. P. I. cracked residuum and agitated at a temperature of 210 F. for two hours. The mixture was filtered to remove the solid precipitated bodies and the filtrate added to additional heavy gas oil in the proportion of one to two. The resulting gas oil mixture had a pour point of 10° F. and an unimpaired ignition characteristic.

While residua from cracking operations contain highly satisfactory pour point depressants, it has been found that crude oil residues resulting from normal straight run distillation operations also contain suitable pour point depressants and they may be blended with normally high pour point gas oils to form suitable low pour point fuels.

For example, asphalt base crude oil which is relatively free from wax may be distilled until a residue is obtained having a melting point between 200° and 350° F. (ball and ring method) and then extracted and blended with the gas oil fuel in the manner described hereinbefore in connection with the cracked residuum with similar results in pour point depression.

Natural occurring asphalts or residual petroliferous material may also be blended with paraffinic hydrocarbon fractions also with similar satisfactory results.

For example, "Producers Crude" which is a naturally occurring San Joaquin Valley residual petroleum, non-paraffinic in nature and having a gravity of 14.5° A. P. I. and viscosity of 125 seconds Furol at 122° F. may be blended with heavy paraffinic gas oil having a pour point of 75° F. in the approximate proportion of 25 to 75 per cent, respectively, resulting in a medium Diesel engine fuel having a pour point of 30° F. A straight run asphaltic residuum of 16-18 A. P. I. gravity and 125 seconds Furol at 122° F. may be blended in the same approximate proportions with the same result.

Other well known pour point depressants may be blended with paraffinic gas oil to reduce the pour point, such as Paraflow, Pourex, asphalt (natural or residual), petroleum pitch or extracts thereof, and waxes such as montan, carnauba, I. G. O. P., I. G. B., I. G. S., I. G. E. All of the I. G. waxes are maufactured by the I. G. Farbenindustrie Aktien-Gesellschaft, Germany, and are believed to be esters of montanic acid. Pourex and Paraflow are condensation products made by the reaction of anhydrous aluminum chloride and a mixture of chlorinated paraffin wax and an aromatic hydrocarbon as disclosed in U. S. Patents No. 1,963,918 and No. 1,815,022.

It is advantageous to blend heavy gas oil, light gas oil, Producers Crude and/or straight run residuum, together in varying proportions, to produce Diesel engine fuels of various grades suited to particular types of engines. Table I gives a tabulation of two typical compression ignition fuels resulting from such blends of these materials.

Table I

| Classification | Medium Diesel engine fuel oil | Heavy Diesel engine fuel oil |
|---|---|---|
| Composition, percent by volume: | | |
| (1) Light gas oil | 45 | 35 |
| (2) Heavy gas oil | 30 | 25 |
| (3) Producers Crude | 15 ⎫ 25 | 15 ⎫ 40 |
| (4) Straight run residuum | 10 ⎭ | 25 ⎭ |

| Test | Method | Unit | Specification Min. | Specification Max. | Typical tests | Specification Min. | Specification Max. | Typical tests |
|---|---|---|---|---|---|---|---|---|
| Gravity | D287-30T | °A. P. I. | 25.0 | 29.0 | 26.8 | 22.0 | 26.0 | 24.6 |
| Viscosity at 100° F | D88-30 | Seconds Say. Univ., °F. | 61 | 80 | 70 | 91 | 125 | 106 |
| Pour point | | | 10 | 35 | 30 | 0 | 35 | 35 |
| Delay number | | Degrees | | | 6½ | | | 7 |
| Cetene number | | | 47 | 58 | 52 | 41 | 54 | 49 |
| Viscosity gravity constant | | | 0.877 | 0.845 | | 0.895 | 0.855 | |

(1) Paraffinic; gravity 30–35° A. P. I., viscosity 33–45 sec. Say. Univ. at 100° F.
(2) Paraffinic; gravity 20–30° A. P. I., viscosity 50–80 sec. Say. Univ. at 100° F.
(3) Non-paraffinic; gravity ±14.5° A. P. I., viscosity 125 sec. Furol at 122° F.
(4) Non-paraffinic; gravity 16–18 A. P. I., viscosity 125 sec. Furol at 122° F.

The light gas oil blended in various proportions with the heavy gas oil according to Table I above, serves to adjust the fluidity or viscosity as well as the pour point, according to the requirements of the service for which it is intended. The allowable viscosity is limited by the value which will produce the optimum injection spray conditions as related to droplet size and penetration to effect maximum combustion efficiency.

It has been observed, as stated before, that the ignition quality of a Diesel engine fuel was a function of its paraffinicity. An empirical expression for the paraffinicity of petroleum oil fractions has been developed from the viscosity-gravity relationships of paraffinic oils. This expression is termed the "viscosity-gravity constant" and is expressed in the formula:

Where $G = 1.082A - 0.0887 + (0.776 - 0.72A)(\log \log (KV-4))$ $G$ = Specific gravity at 60° F.
$A$ = Viscosity-gravity constant
$KV$ = Kinematic viscosity in millistokes at 100° F.

Figure 2:
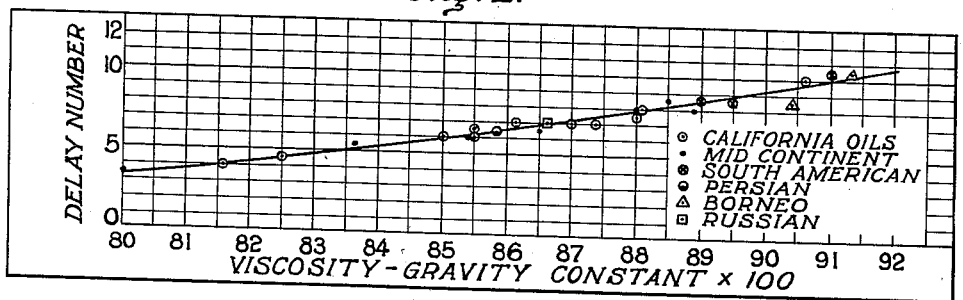
Fig. 2 is a curve showing the relationships between viscosity-gravity constants and delay numbers of various oils.

Since the viscosity-gravity constant is an expression of the paraffinicity of an oil then it logically follows that the viscosity-gravity constant of a Diesel engine fuel is also indicative of its ignition characteristics. This is shown to be true as illustrated in Fig. 2 where the delay numbers of a variety of Diesel fuels as determined experimentally on a modified variable compression C. F. R. engine have been plotted against their respective viscosity-gravity constants.

Figure 3:
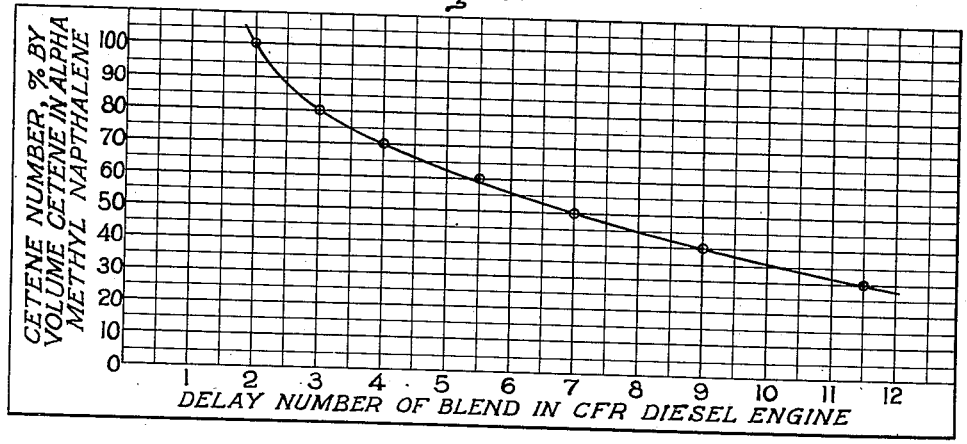
Fig. 3 is a curve showing the relationships between delay numbers and corresponding cetene numbers of various oils.

As stated hereinbefore, the curve in Fig. 3 indicates graphically the relationship between cetene numbers and delay numbers for Diesel engine fuels as determined experimentally on a modified variable compression C. F. R. engine.

The curve in Fig. 1 illustrates the relationship between cetene numbers and viscosity-gravity constant of Diesel engine fuels. This curve has been derived from the empirical data of the curves in Figs. 2 and 3, within the usual range of Diesel engine fuel viscosities, and it is observed to be practically a linear function of cetene number and viscosity-gravity constant. It is apparent, therefore, that the ignition quality of a compression-ignition fuel is a function of its paraffinicity, for which the viscosity-gravity constant is a satisfactory expression.

The delay numbers and corresponding cetene numbers and viscosity-gravity constant for the typical Diesel engine fuels discussed hereinbefore are found in Table I.

The heavy paraffinic gas oil may be derived from Los Angeles Basin crude oil or other suitable paraffinic crude oils, or it may be obtained by the distillation of cracked wax. In the case where the heavy gas oil is derived from cracked wax a suitable Diesel oil fuel having a low pour point may be obtained by blending back a small percentage of the residue resulting from the said distillation of the cracked wax products.

This invention is not to be limited to the specific blended materials illustratively disclosed herein, nor to the specific pour point depressants, but covers all materials and any pour point depressant within the scope of the invention.

We claim:

1. A compression ignition internal combustion engine fuel comprising a blend of 60 to 75 percent of a paraffinic hydrocarbon fraction of the gas oil type and 25 to 40 percent of a residual asphaltic hydrocarbon said blend having a viscosity gravity constant between about .845 and .895.

2. A compression ignition internal combustion engine fuel according to claim 1 having a viscosity range between 60 and 125 seconds Saybolt at 100° F. and a cetene number between 41 and 58 and a pour point not exceeding 35° F.

3. A compression ignition internal combustion engine fuel comprising a blend of 75 percent of paraffinic gas oil having a viscosity of 30–80 seconds Saybolt Universal at 100° F. and a gravity of 20–35° A. P. I. and 25 percent residual asphaltic hydrocarbons having a viscosity in the order of 125° Furol at 122° F. and a gravity of 14–18° A. P. I.

4. A compression ignition internal combustion engine fuel comprising a blend of approximately 75 percent. paraffinic gas oil and 25 percent. non-paraffinic residue having a viscosity gravity constant between .845 and .88.

5. A compression ignition internal combustion engine fuel comprising a blend of approximately 60 percent. paraffinic gas oil and 40 percent. non-paraffinic residue having a viscosity gravity constant between .855 and .895.

6. A composition according to claim 4 with a pour point not over 30° F.

7. A composition according to claim 5 with a pour point not over 35° F.

8. A compression ignition internal combustion engine fuel comprising a blend of approximately 60% of paraffinic gas oil having a viscosity of 30–80 seconds Saybolt Universal at 100° F. and a gravity of 20–35° A. P. I., and 40% residual asphaltic hydrocarbons having a viscosity in the order of 125 Furol at 122° F., and a gravity of 14–18° A. P. I.

9. A compression ignition internal combustion engine fuel according to claim 1 and having a cetene number between approximately 41–58.

10. A compression ignition internal combustion engine fuel according to claim 5 and having a cetene number between approximately 41–58.

11. A compression ignition internal combustion engine fuel comprising a heavy paraffinic gas oil hydrocarbon fraction having a viscosity in the order of 50–80 seconds Saybolt Universal at 100° F. and a gravity of 20 to 30° A. P. I., a light gas oil hydrocarbon fraction having a viscosity in the order of 33–45 seconds Saybolt Universal at 100° F. and a gravity of 30–35° A. P. I., and a residual hydrocarbon containing pour point depressant material, the said heavy gas oil, light gas oil and residual hydrocarbon being blended in the proportions of approximately 30, 45 and 25 per cent, respectively.

12. A compression ignition internal combustion engine fuel comprising a heavy paraffinic gas oil hydrocarbon fraction having a viscosity in the order of 50–80 seconds Saybolt Universal at 100° F. and a gravity of 20 to 30° A. P. I., a light gas oil hydrocarbon fraction having a viscosity in the order of 33–45 seconds Saybolt Universal at 100° F. and a gravity of 30–35° A. P. I., and a residual hydrocarbon containing pour point depressant material, the said heavy gas oil, light gas oil and residual hydrocarbon being blended in the proportions of approximately 25, 35, and 40 per cent, respectively.

CHARLES CHILTON MOORE, Jr.
GEORGE CHAPELTON SHEPHERD, Jr.